(12) United States Patent
Besser (10) Patent No.: US 11,601,013 B1
(45) Date of Patent: Mar. 7, 2023

(54) SYSTEM AND METHOD FOR WIRELESS TRANSMISSION OF ELECTRICITY

(71) Applicant: Ronald L. Besser, York, PA (US)

(72) Inventor: Ronald L. Besser, York, PA (US)

( * ) Notice: Subject to any disclaimer, the term of this patent is extended or adjusted under 35 U.S.C. 154(b) by 0 days.

(21) Appl. No.: 17/861,903

(22) Filed: Jul. 11, 2022

(51) Int. Cl.
*H02J 50/00* (2016.01)
*H02J 50/20* (2016.01)

(52) U.S. Cl.
CPC ............ *H02J 50/001* (2020.01); *H02J 50/20* (2016.02)

(58) Field of Classification Search
CPC ......... H02J 50/001; H02J 50/20; Y02D 30/70
See application file for complete search history.

(56) References Cited

U.S. PATENT DOCUMENTS

| | | | | |
|---|---|---|---|---|
| 11,322,979 B1* | 5/2022 | Dinwiddie | ............... | H02J 7/345 |
| 2006/0281435 A1* | 12/2006 | Shearer | ................ | H02J 50/001 |
| | | | | 455/343.1 |
| 2007/0114381 A1* | 5/2007 | Jackson | ................ | G21K 1/087 |
| | | | | 250/284 |
| 2007/0191075 A1* | 8/2007 | Greene | .................... | H02J 50/20 |
| | | | | 455/299 |
| 2009/0067208 A1* | 3/2009 | Martin | ..................... | H02J 50/20 |
| | | | | 363/126 |
| 2014/0152016 A1* | 6/2014 | Jennings | ................... | F03G 7/08 |
| | | | | 290/55 |
| 2015/0102675 A1* | 4/2015 | Dinwiddie | ........... | H02N 11/002 |
| | | | | 174/6 |
| 2015/0308263 A1* | 10/2015 | Payne | ..................... | E21B 47/12 |
| | | | | 340/854.9 |
| 2016/0049839 A1* | 2/2016 | Paiva | ..................... | H02K 11/30 |
| | | | | 310/68 R |
| 2017/0025857 A1* | 1/2017 | Matthews | ............... | H02J 50/40 |
| 2017/0117714 A1* | 4/2017 | Dinwiddie | ................ | H02J 4/00 |
| 2018/0081075 A1* | 3/2018 | Smiarowski | ........... | G01V 3/165 |
| 2018/0145853 A1* | 5/2018 | Nguyen | ................ | H04L 27/152 |
| 2018/0355837 A1* | 12/2018 | Bonutti | ................. | F03B 13/148 |
| 2019/0181686 A1* | 6/2019 | Adolf | ........................ | H01P 3/08 |
| 2019/0281371 A1* | 9/2019 | Klicpera | ................ | H04Q 9/00 |
| 2020/0245440 A1* | 7/2020 | Loughan | ................... | H05F 7/00 |
| 2021/0061648 A1* | 3/2021 | Towfighian | ........... | B81B 3/0021 |

* cited by examiner

*Primary Examiner* — Rexford N Barnie
*Assistant Examiner* — Joseph N Inge
(74) *Attorney, Agent, or Firm* — Dale J. Ream (57) ABSTRACT

A system and method for wireless transmission of electricity through the air utilizes Earth's natural magnetosphere or an induced magnetosphere to produce electrons which may be systematically converted to almost weightless preparticles called muons that are transmittable from a tower with a low frequency radio signal.

13 Claims, 7 Drawing Sheets

SYSTEM AND METHOD FOR WIRELESS TRANSMISSION OF ELECTRICITY

BACKGROUND OF THE INVENTION

This invention relates generally to generators and transmission of electricity and, more particularly, to a system for wireless transmission of electricity that utilizes a magnetosphere to produce electrons which may be collected and converted to almost weightless muons that are transmittable with a low frequency radio signal.

Transmission of electricity through the air was attempted in the past by famed scientist Nikola Tesla. In fact, Tesla conducted multiple experiments between 1890 and about 1906 testing is early 30s into wireless transmission of electricity. Despite his many patents and invention of the method of alternating current, he was unsuccessful regarding fireless transmission of electricity. Failure of prior attempts is largely because the magnetosphere or charged atmosphere has been largely misunderstood. Past attempts proved that transmission of electrons out of the magnetosphere is a useless exercise and electrons are far too weak and far too heavy to use.

Therefore, it would be desirable to have a system for wireless transmission of electricity through the air that utilizes Earth's natural magnetosphere or an induced magnetosphere to produce electrons which may be systematically converted to almost weightless preparticles that are transmittable from a tower with a low frequency radio signal.

SUMMARY OF THE INVENTION

First, the present invention uses terminology that is, in some ways, outside the safe perimeter of traditional physics and electricity. However, it will be understood that the present invention expands, corrects, and explains components of physics and electrical transmission that were commonly referred to by the famous scientist Nicholas Tesla and others. Therefore, the subject matter of the present invention is, in fact, a manufacturable device and is patentable subject matter pursuant to 35 USC 101.

A system and method for the wireless transmission of electricity is disclosed. The key to this invention is to not allow electrons to be transmitted but force the modification of the free electrons coming out of the magnetosphere 100 and converted to a preparticle that can be transmitted. Specifically, each electron is passed through a transducer that changes the electron's polarity by reducing amperage in the electron, thereby fluxing the electron into its counterpart and what is referred to as a muon. When transmitted muons arrive at a car antenna or house antenna the resistance on the antenna is already strong enough to convert the new preparticle back to a flow of electrons and the normal service can be used as electricity of the normal style.

With further specificity, an electron contains pre-matter sparks called ultimatons and the body of an electron is made up of 100 of them. When one of those sparks is forced out of the electron body it changes itself into a muon. A muon almost flies into the air by itself and is easily transmitted as a low frequency radio broadcast off a specifically configured tower. There is a minimum height of a tower and a maximum tower height that had to be computed using the arc of the earth's curvature which the magnetosphere covers precisely. The wiring includes an underground cable beneath three dynamo generators which feed off the cable and magnify the magnetosphere output by adding their generating capacity to the cable and to the top of the tower.

An overall summary of the invention is that the output of the cable and the generators consistently generates an electrical conduit for the endless supply of electricity out of the magnetosphere.

A critical aspect of the present invention is that the magnetosphere produces unusable electrons which must never be used on the tower. These so-called satellite electrons are even heavier than normal electrons are and are too heavy to transmit through the air. Tesla tried to transmit satellite electrons and they are rocks compared to the feather light muon which has no voltage whatsoever. The tower in this invention carries 20 megawatts of electricity to the top of the tower and if a person were to touch the tower, that person would get a slight tingle in his arm. That is a muon effect and they are harmless and cannot electrocute a person.

The present invention includes these primary components:

The Induction Sphere. This is a sphere hung within twenty feet of the top of the tower like a plumb bob on a survey transit. It hangs down the center of the tower and its job is to solidify the magnetosphere transmission of electrons into the fact that the tower is made into an electromagnet and the sphere forces electrons onto the magnet for transmission first to the underground cable and then generators.

The Cable. It must be designed very specifically and buried at a precise depth to be the consistent receptor of the magnetosphere broadcast of standard electrons through the transducers. In many respects other than forcing electrons to become another style preparticle, it is the precision of installation and use of the cable that makes endless production of electricity inexpensively and totally feasible. The magnetosphere produces one megawatt of electricity every second, not more or less. That output is captured first by the cable and then magnified by generators above it.

Transducers. Each transducer uses a one-inch metal plate and places holes in it to take bolts four inches long, and press the bolts through the holes and solder the back securely, then the generators may be wired through this device such that the output of the generators is converted from electrons to muons. There are five transducers that must be wired into the apparatus.

Therefore, a general object of this invention is to provide a system for wireless transmission of electricity that utilizes a magnetosphere to produce electrons which may be converted to almost weightless muons that are transmittable with a low frequency radio signal.

Another object of this invention is to provide a system for wireless transmission of electricity, as aforesaid, that utilizes a tower, induction sphere, a buried cable, and a plurality of transducers together in a wired connection.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from FIG. 2a;

FIG. 2c is an isolated view on an enlarged scale taken from FIG. 2a;

FIG. 2d is an isolated view on an enlarged scale taken from FIG. 2a;

FIG. 3b is a sectional view taken along line 3b-3b of FIG. 3a;

FIG. 4b is a sectional view taken along line 4b-4b of FIG. 4a.

DESCRIPTION OF THE PREFERRED EMBODIMENT

A system for wireless transmission of power (WTP) according to a preferred embodiment of the present invention will now be described with reference to FIGS. 1 to 4b of the accompanying drawings. The system 10 for wireless transmission of power (a.k.a. transmission of electricity) includes a tower 20, a plurality of generators 30, a plurality of transducers 40, and induction sphere 50, and an electric cable 60 situated in a trench 70.

The Design of The Tower

Figure 1:
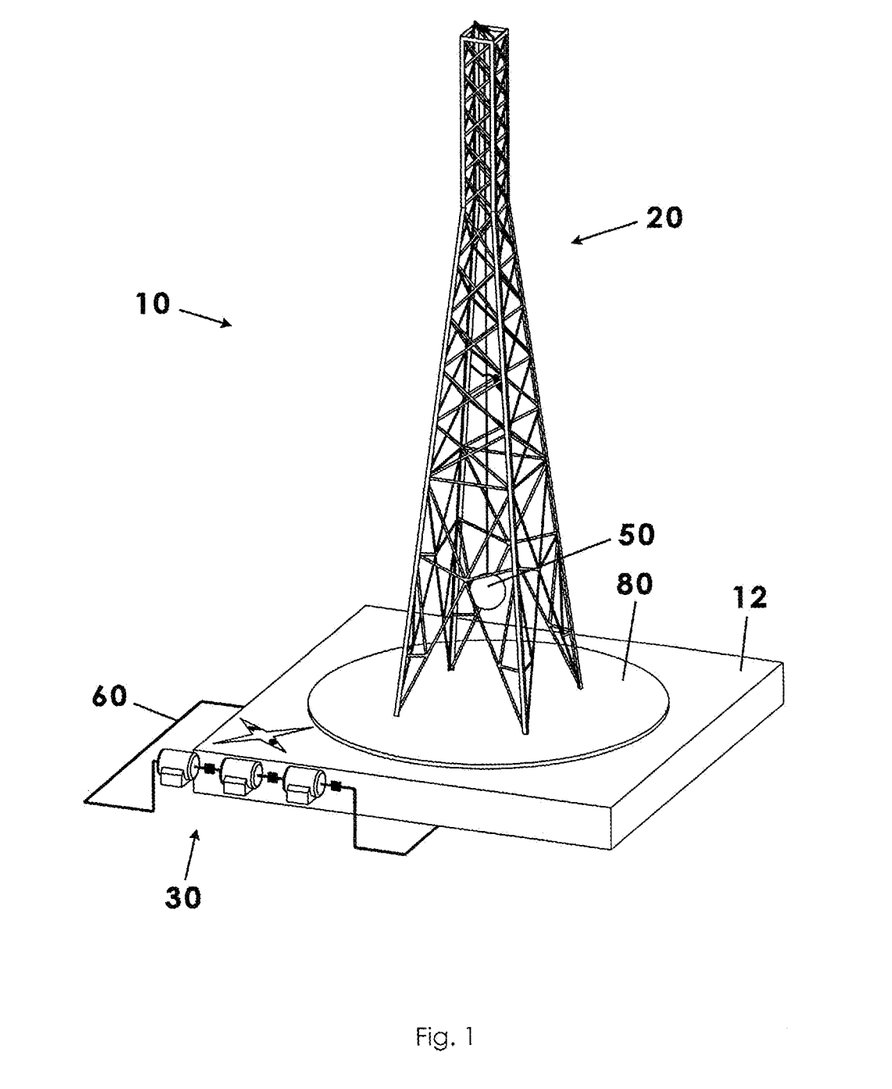
FIG. 1 is a perspective view of a system for wireless transmission of electricity according to a preferred embodiment of the present invention.

In a critical aspect, the present invention includes a tower 20 that is preferably built to exacting dimensions and configurations as will be described below. In fact, the tower 20 provides the basis for much of the rest of the invention. A signal transmitter 25 may be mounted atop the tower 20 and configured for transmission of electricity in a form to be described later. The tower is shown in FIG. 1. For instance, the tower 20 may be a four-leg angular box type tower having a predetermined height that is respectively proportional to a transmission radius. For instance, the tower may be 230 feet tall that transmits in a 200-mile radius. Similarly, the tower may be 400 feet tall and have a 400-mile transmission radius. Similarly, the tower may be 600 feet tall and have a 600-mile transmission radius.

Further, the tower 20 has a North leg 22 that faces precisely toward the magnetic North Pole such that an area extending from the North leg to the South leg 24 becomes an electromagnetic conduit in electrical communication with the cable 60. The tower 20 associated with this invention is both an electromagnet and a flux generator itself and that is why it is so vital to always point the North leg 22 of the tower 20 precisely on the magnetic north pole.

First, the magnetosphere and preparticle physics, as traditionally understood, must be redefined in order to understand the role of the tower. The magnetosphere is the source of free electricity, as it fully generates one megawatt consistently and never fails unless the equipment fails. The magnetosphere 100 referred to herein and as applied in the present invention is a flux related to the ideal of mixing rotational static electricity with the more important flux resulting from the earth using the sun as its primary support to maintain itself. Yet, the so-called magnetosphere does not reduce its electrical power except in some rather unusual ways.

For that reason, this invention does not fully accept the scientific view that any flux is developed out of electrical conductivity. Rather, electrical conductivity is more the result of quanta being collected by the strong nuclear force which is never properly defined by current day science. The strong nuclear force is a continuum collection of broken particles and strong forces emanating from deep space. First, the strong nuclear force is likely a combination of forces which combine as one wave unit. But a wave of what? Our tower is a component of the strong nuclear force and must never align itself with the Tesla oscillator since any oscillator deadens the flux of anything radiating electrons or protons as well. Neutrons spell difficulty for the strong nuclear force because while neutrinos actually penetrate through most of the earth mantle deep into salt mines as seen by collectors, neutrinos die out and revert to neutrons or, of all things, to a peculiar style of electron the magnetosphere does reproduce. The neutrino is without a good name so long as it does not relate back to the neutron from which it sprang as a modified preparticle losing almost half of its pre-matter ultimatons when bombarded by radium in deep space.

As outlined above, the tower 20 associated with this invention is both an electromagnet and a flux generator itself and that is why it is so vital to always point the north leg of the tower precisely on the magnetic north pole. Tesla figured the north magnetic pole was rather useless but came to mistakenly regard the oscillator as the preferred method to attract free electrons. But in actual practice that does not work primarily because the magnetic north pole does not generate electrons according to traditional thinking, and in truth generates mesotrons first and then electrons as the electron is easily modified when it gains or loses ultimatons, the pre-matter sparks that form all preparticle presences.

The tower 20 described herein is four legged and must remain that way mostly due to the fact we must use two of its legs to replicate the magnetic north pole inside the tower legs and underneath the tower. That allows the south tower leg 24 to transmit not electrons but muons as described above. As described herein, the south tower leg 24 may itself be a transmitter of pre-particles. In another embodiment, however, and actual electronic transmitter 25 may be mounted to the south tower leg 24 or electrically coupled thereto. For this reason, the south tower leg is properly labeled both with reference character 24 and 25 in FIG. 4a. Together, a magnetosphere 100 rich in electrons is formed proximate or encircling the tower.

The magnetic north pole must be realigned off the top of the tower 20 in order to be sure that the flux from under the tower legs does not become explosive. That problem is tamped down by hanging an "induction sphere" 50 off the top of the tower to within thirty feet of the ground 12. The induction sphere successfully removes stray ozone gas interference by forcing radical Oxygen to dissipate as hydrochloric condensate which evaporates rather than fuses to surfaces.

The tower legs are embedded on a one-foot-thick concrete pad 80 (a.k.a. base member) rotatably mounted in the ground 12. The pad is configured to operate like a Lazy Susan and rotates sufficiently to relocate the North tower leg precisely facing the true magnetic pole. The leg is designed to check the bearing to such and relocate the leg by rotation evidence of a highly calibrated magnetometer attached to the tower 20 and the Lazy Susan so as to adjust it.

Sphere Casing

The induction sphere 50 may include a casing that may be made in two parts although one sphere without seams is preferred. From the equator to the top use copper plate about ¼th inch thick. Inside the sphere is reinforced a copper plate with an interior housing of non-ferrous materials. Plastics are unsuitable for construction of the induction sphere. Preferably, a bottom half of the induction sphere 50 may include a Teflon coating that is non-conducting.

Attach to the Tower

Using the top strut on the tower 20, the induction sphere 50 is hung from the top strut using a coaxial cable. It must be threaded through a secondary strut also explained earlier and drop the sphere through to within thirty feet of the center of the concrete pad.

The induction sphere 50 may be secured by the cable connecting to a pin installed in the absolute center of the concrete pad 80 into a hole drilled there which allows the securing pin to be securely attacked sixteen feet (16') deep. The hole can be backfilled with common dirt, but the top six inches to elevation requires crushed marble of any type and so long as it is at least six inches deep to the top of the hole. The reason this is done is to prepare the induction sphere to provide no tachyons, but great volumes of mesotrons and muons. The induction sphere produces electrons as well, but they quickly dissipated on the concrete pad itself.

Filling the Induction Sphere

The induction sphere may be filled with steel turnings sold as scrap but not rusty or dirty. Preferably, the induction sphere 50 is not filled completely full. It is to be filled about three-quarters full and the upset limit on fill is that it must not weigh, when filled, more than two hundred thirty (230) pounds. The weight is more important than the volume measurement.

How to Figure the Size of the Induction Sphere

The size of the induction sphere 50 is determined by tower height using the following formula: 230–Minimum tower height is 230'=twelve-foot diameter (12') 400–Fifteen-foot (15') diameter. Tower height may not exceed six hundred feet (600').

There is a formula to compute the Induction Sphere diameter.

Formula

PI (x) proposed tower height divided by constant 63.1527 For example to compute for a 600' tower 3.141593×600/63.1527=29.85 round up to 30-foot diameter. It is understood that the constant is a derivation of the earth's circumference divided by a vector force in Einstein's equations number 47 and number 51 in his notebook.

The Buried Cable Underneath the Generators

In a critical aspect, the system for wireless transmission of electricity 10 includes a cable 60 that is buried in a trench 70 beneath the plurality of generators 30 according to very specific conditions as will be described below. The cable is composed of twelve (12) strands of any ferrous material. This is a magnetosphere cable and must be carefully attended to in its installation and care. The installer may use non-oxide ferrous materials that have no aluminum or copper anywhere near the actual cable 60 as those metals destroy magnetosphere flux entirely, with further description of the magnetosphere being described later. Further, the cable 60 preferably uses 0.09- or 0.10-inch wire and is composed strictly of twelve (12) strands only. The finished diameter of the cable 60 is about six inches (6" round) and the length is determined by the layout of the three generators in tandem to be used. Added to those design parameters, there is a lead of at least twelve feet (12') and out of the last generator, the lead through the plant wall to the tower should be at least fifteen feet (15'). Detailed wiring is explained in a later section for cable connections to the tower 20.

With further reference to the cable 60, the end of the cable is preferably divided into four (4) pigtails. To do this, a contractor may be instructed as follows: hold the end of the cable 60 before one enough to see where to start, and the contractor may start anywhere. But once a place to start with the first three wires out of the total cable 60, one must rotate the cable toward the body or chest, select the next three wires and twist into a pigtail. Do this until all twelve strands in the cable 60 are made into pigtails.

Then a preferred use of the pigtails in sequential connections is as follows. The first pigtail is a lead to wire to Transducer 1 (T1), and Pigtail 2 is to Transducer 2 (T2), Pigtail 3 is to T3 but carefully installed per instruction later about how to wire the generators and tower. Pigtail 4 is not used and may be wired out of the circuit.

Trench Construction

In an embodiment, the cable 60 must be laid in a trench 70 having a very specific configuration. First, it is critical that there be no humidity in the trench. Preferably, a maximum transient humidity allowed is 12%, but operations should never exceed ten percent (10%) as the magnetosphere flux is shorted at around twelve percent (12%), and sometimes lower.

Construction of the trench 70 before laying the cable is critically done to avoid transient humidity to develop since the stone backfill always carries nematodes and bacteria and therefore the stone must be irradiated before use in the trench where ever it is to be placed.

The trench 70 includes a flat bottom while following the grade from the first generator to the exit wall at the plant site. The trench walls and floor must be fully extricated from any hint of heavy metals including fluorides and bromides and any sand used in the construction in or near the trench must be out of a powder phase and glued in place. Silicon razes magnetosphere flux by reducing the atomic weight of the strong nuclear force attendant upon the electrons entering from the magnetosphere flux.

The trench 70 extends before and beyond the generators as mentioned above. The excavation shall be at least sixteen feet deep (16' deep) and a maximum of six feet wide (6' wide). Preferably, the cable is encapsulated in a solidly done enclosure and laid in the trench 70 and removed when the stone fill is to be applied. The 6" round metal cable is laid flat on the floor with no hint of kinks or mid elevation changes, especially of the change to higher elevations regardless of how slight. The cable needs to be bedded on twelve (12") inches of crushed and cleaned bauxite ore with nuggets no larger than four inches (4") as larger (more than four inches) nuggets tend to clog the flow of electrons if present.

Preferably, the cable 60 should be insulated overtop with about fourteen feet (14') of the same type of bauxite ore as it is bedded on. The last foot to grade should be degaussed borax granules or crushed limestone to a consistency of six-inch (6") stones. The very top of the trench 70 herein describe is a ground zero area of generator fluxing and it must be dissipated before it blows up as ozone or other flammable gasses. The cable 60 needs to be laid in the trench as describe above, but it also needs to attach a wire from it to the first generator and a wire to the third generator. There is no precision required to do that but keep the wire perpendicular to the core of the generator and the covered cable 60. Preferably, the trench 70 and the cable 60, once in and before filled, be degaussed twice, once installing it and once after fill is applied. Further, it is recommended that the trench be heated to nearly 165 F degrees to exterminate any and all bacterial and hold that temperature for about one hour to make sure the bottom of the trench is included in the extermination of any pest foliage or nematode.

Generators

Figure 2A:
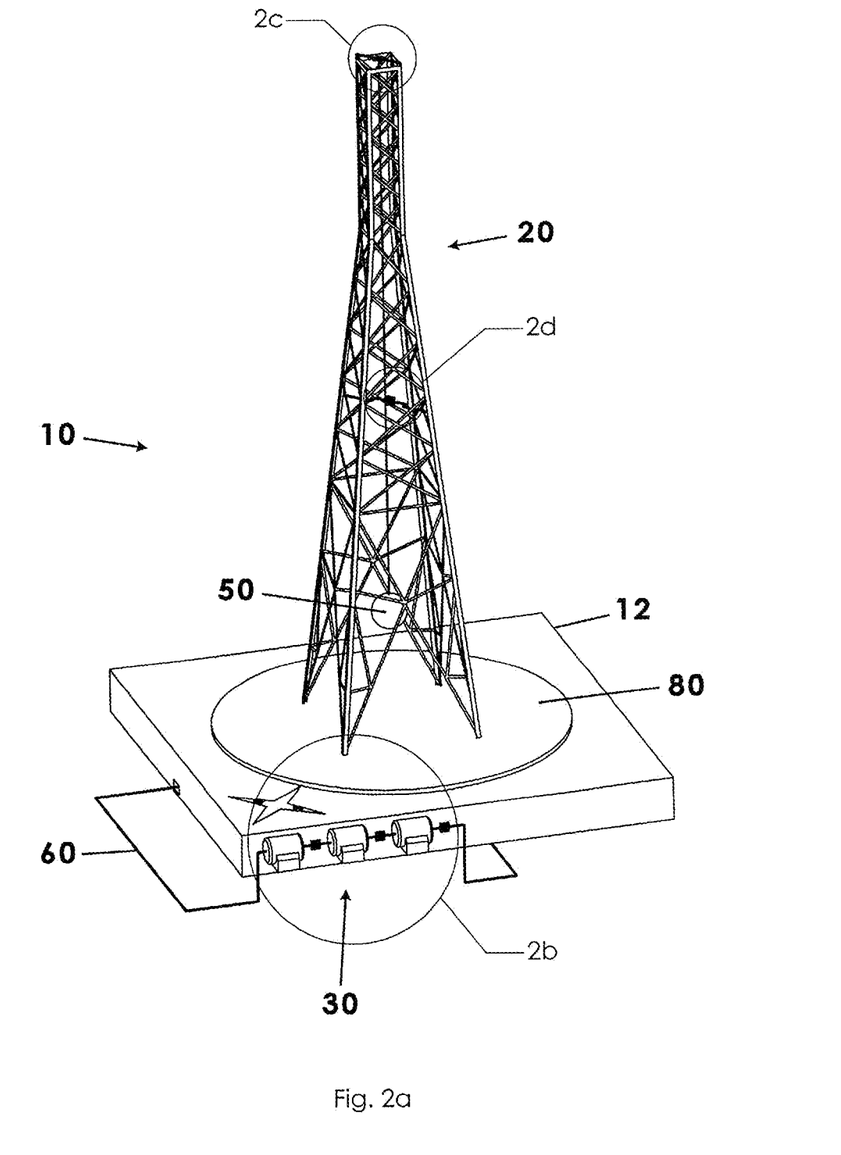
FIG. 2a is a perspective view from another angle of the system as in FIG. 1.
Figure 2B:
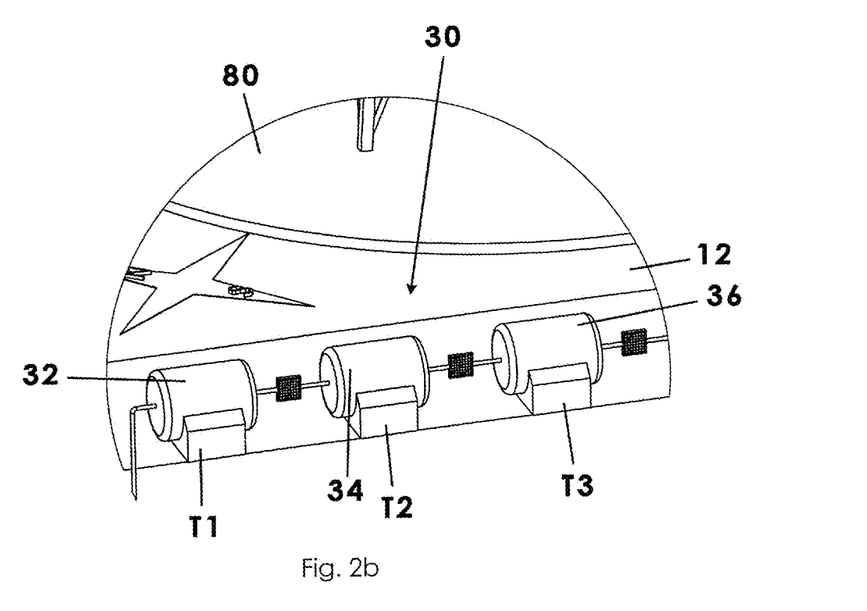
Figure 2C:
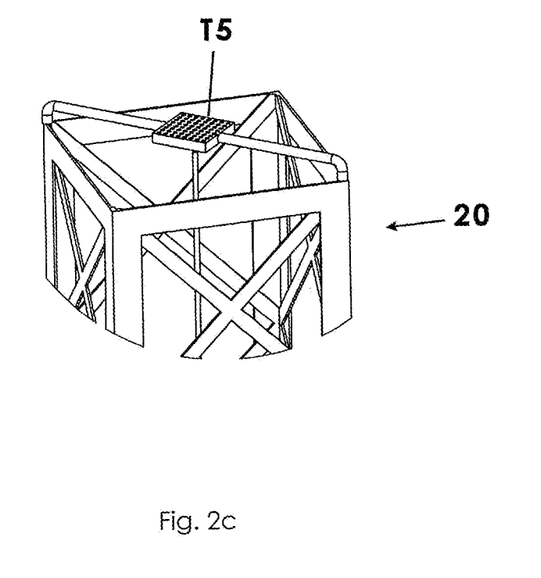
Figure 2D:
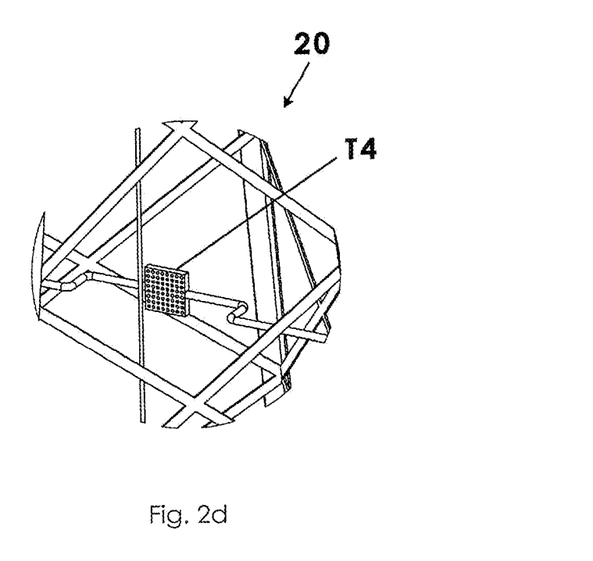
Figure 3A:
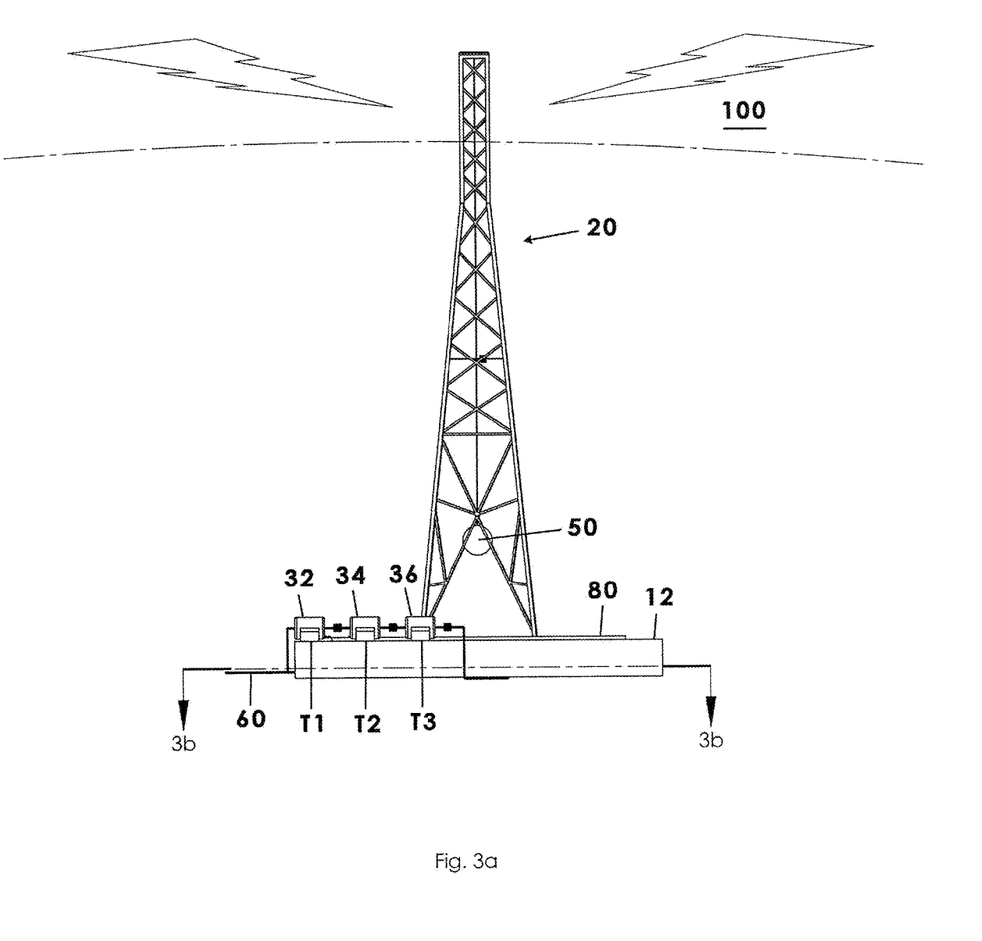
FIG. 3a is a front schematic view of the system as in FIG. 1.
Figure 3B:
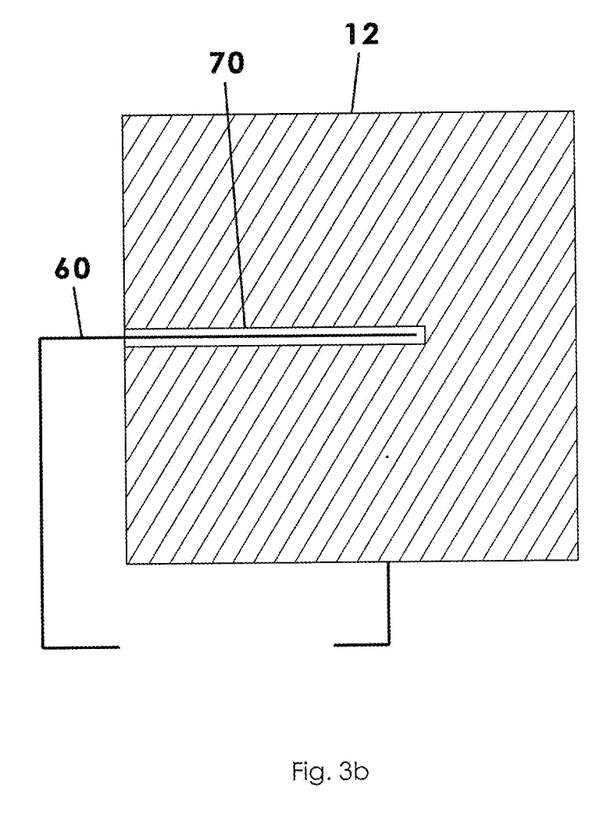
Figure 4A:
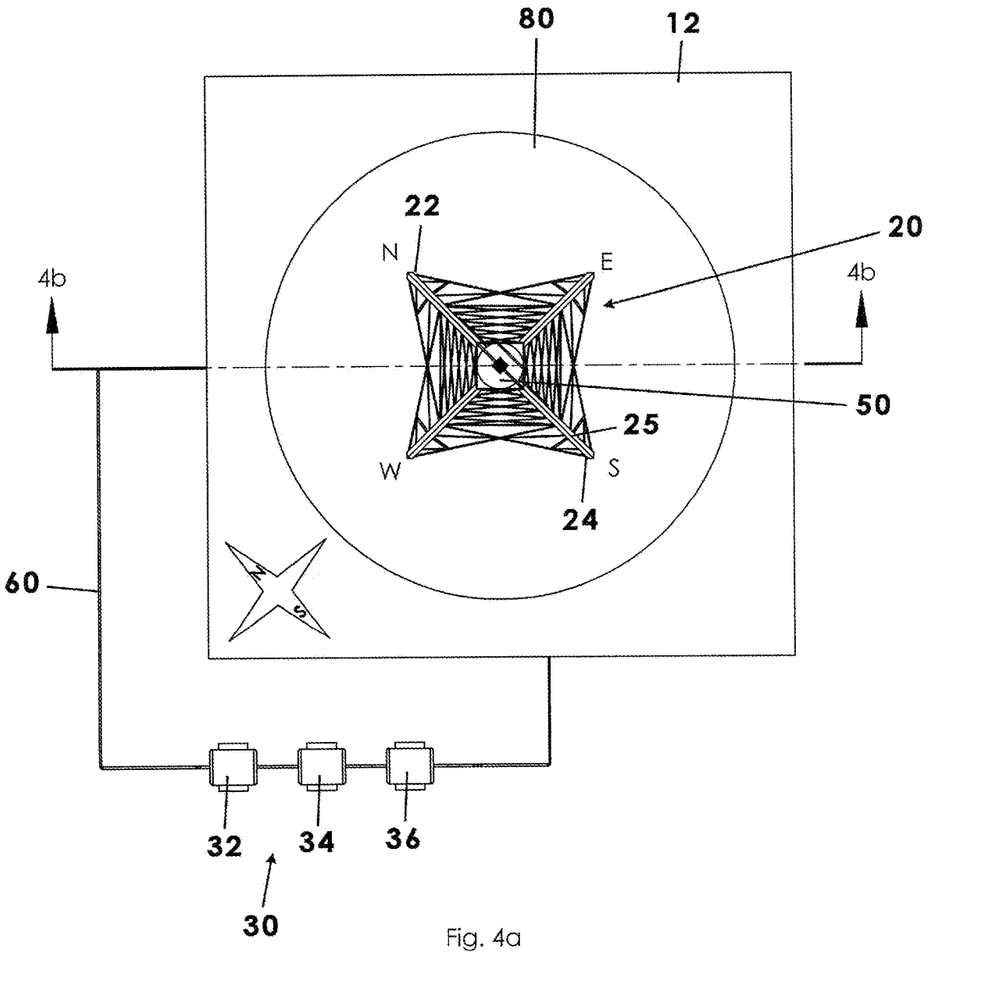
FIG. 4a is a top view of the system as in FIG. 1.
Figure 4B:
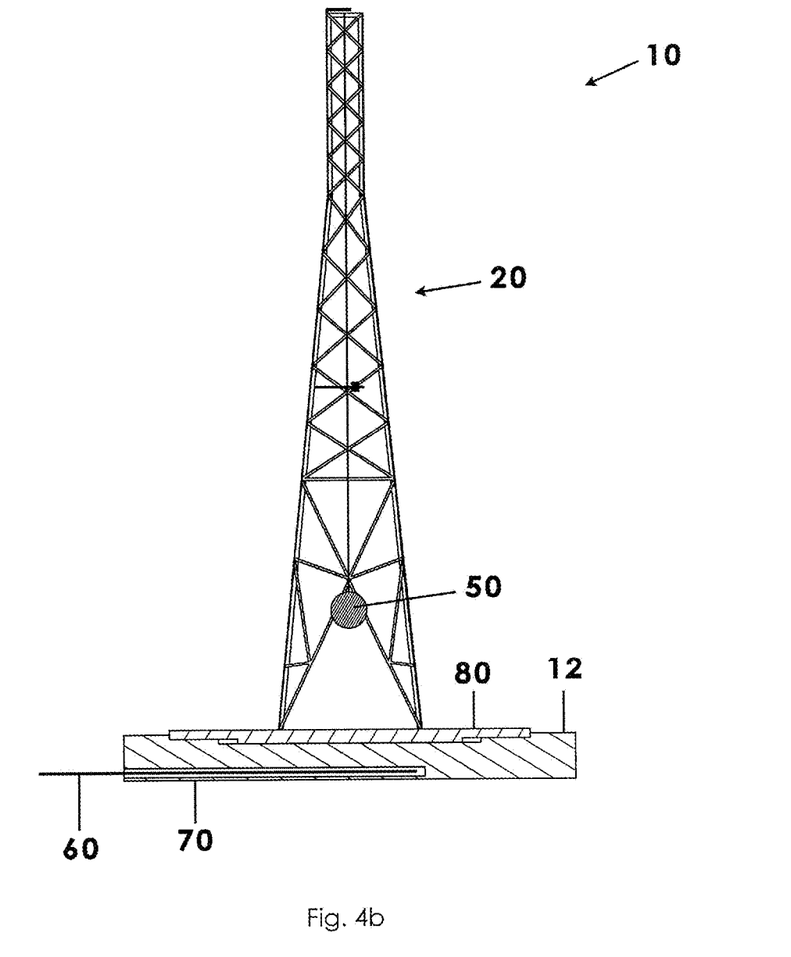

The system for wireless transmission of electricity 10 includes a plurality of generators 30 in electrical communication with the electrical cable each being described in detail below. A type of generator that may be used in the present invention is shown in FIG. 2b. More particularly, the present invention discloses a first generator 32, a second generator

34, and ⅓ generator 36. The system for wireless transmission of electricity 10 also includes a plurality of transducers 40 in electrical communication with the plurality of generators 30, respectively. For simplicity, the transducers may be referred to with reference characters T1, T2, T3, T4, and T5. Each of the generators includes a rod that is configured to mechanically generate electricity (via axial rotation thereof) energized as is known in the art and respective transducers are in electrical communication with respective generators and configured to convert electrons associated with the generated electrical power into a plurality of preparticles that include muons. The actual construction of the plurality of generators will now be described in detail.

Modified Turbine Style Generators are as Follows:

In an embodiment, the rotor may be replaced with a hydrostatic device known as a Stimulator. The Stimulator has three blades housed in a fan guard and produces an output of three thousand five hundred Voltaire (3,500 v) and operates off a separate voltage regulator from a power source other than from the metal cable or off or from the tower generation of free electricity. The Simulator is to be designed to run at eight thousand (8 k) RPM. The Stimulator may be affixed in a turbine as illustrated.

The Stimulator

Preferably, the Stimulator is installed only on the last of three generators 36, respectively, and comes before the rotor shaft of the third generator 36. The six-foot diameter fan in its own housing uses the rod of the manufactured $3^{rd}$ generator to place the Stimulator into working order. The Stimulator is used to vent the buried cable primarily, but it also increases the flux obtained from the buried cable. It is designed to run at 8,000 rpm, and operates efficiently between 104 F and 133 F.

This invention requires the addition of transducers to wire the tower properly to produce transmissible electricity without wires off a tower. If the tower is not wired properly, it will not broadcast the preparticle necessary to produce wireless electricity for the home and transportation needs. Proper wiring is essential but the transducer's purpose is also to convert one type of preparticle by modifying electrons to change it into another type of preparticle retaining the voltage required for normal household or transportation use. Electrons are not transmissible without wires.

Construction of Transducers

More particularly, a transducer is a block of high tensile steel. Preferably, a transducer is constructed using high quality Tungsten-chromium steels rating number 72xx W 1.75% and Cr 0.75%. All transducers should be configured with the dimension of one inch (1") thick and twelve inches (12") square. All Transducers must appear milled with six one-inch (1") diameter predrilled holes. Starting one inch down from the top of the block drill parallel holes two beside each other separated by 2½" and the next set located from the top of the block four inches (4") and drill two holes as above, and the third set of dual holes are located six inches (6") from the top of the block.

Bolts have to be placed into the holes in the following manner:

Top Two Holes

All transducers have four-inch (4) carbon steel bolts inserted into the block in the first two holes at the top. The head of the bolt faces to the front of the transducer. The back of the bold is secured at the back of the transducer preferably soldered with high carbon tungsten solder. They may also be secured by large bolts if they are securely wrapped in a Teflon holder.

However, some of the five (5) transducers are arranged differently in wiring as described individually below.

Transducer One (T1)—

T1 is attached to the first generator 30 and is attached to the underground cable 60 by a length of insulated wire leading to the Generator 1 30. T1 transfers the flux of the magnetosphere from the receiving cable 60.

Transducer Two (T2)—

T2 is in the front of the second generator 34 and there is a wire between T1 and T2 directly. The wire between these two transducers is insulated with a carbon-based wrapping.

Transducer Three (T3)

T3 is the most critical of all the Transducers. T3 is electrically connected to T2 and to the South Tower leg. T3 produces only muons converted from electrons by the transducer by kicking out one of its pre-matter sparks referred to as an ultimaton. It requires 100 ultimatons to form an electron, and the electron must be modified by forcing one ultimaton out of its structure leaving the old electron with 99 ultimatons, which in fact is no longer an electron but now takes the form of a muon. It is the antigravity effect of the muon which can be transmitted when it is modified out of electrons. Muons can be formed out of protons but a muon-proton has 68 ultimatons and so quickly dies that it cannot be held reliably to transmit them.

T3 is wired to the South Tower leg with a muon device called a Solanator. A Solanator is part conduit and part wiring. The entire apparatus is called a Solanator. The wire out of Generator 3 containing T3 goes to the connection on the outside wall of the plant into the Solanator, and that conduit is attached to the wall and not the tower. The Solanator can reach approximate between thirty (30) and forty (40) feet high and be wired from it to a label on the South Tower leg. This connection now becomes a duplicate electromagnet 30-40 feet high or so to the electromagnet formed underground between the North tower leg and the South tower leg. The second electromagnet may now be replicated in parallel with the underground electromagnet which nature formed all by itself. To maintain electricity transmission the tower's North leg must always face due North to the magnetic North Pole. See the tower description elsewhere how to align the North tower leg every 59 minutes.

Transducer Four (T4)

T4 is positioned sixty feet up the tower independent of the Solanator. It is positioned on a strut of the tower 20 between the North leg and the South leg only. Its face is to align with the magnetic north alignment of the North tower leg. T4 allows the tower 20 to break with the magnetosphere in severe wind or thunderstorms and prevents electrons or muon lightning from finding the tower easily. Tachyon lightning will never strike a tower installed with a T4 transducer.

Transducer Five (T5)

T5 is placed on a strut at the box top of the tower 20 and just under it by about six feet. All six bolts must be in this device. It aligns the tower properly with true magnetic north in addition to the Lazy-Susan style base member 80 (also known as a pad 80) the tower 20 is built upon. It is understood that the base member 80 may include a concrete pad that is rotated using motors and gears having a structure that would be known in the art. T5 is positioned above the induction sphere 50 which must be wired through a hole in the strut so its cable can pass through it to hang precisely in the center of the tower 20 to feed free electrons into the buried flux cable 60. T5 is positioned in alignment to the North tower leg.

It is understood that while certain forms of this invention have been illustrated and described, it is not limited thereto except insofar as such limitations are included in the following claims and allowable functional equivalents thereof.

The invention claimed is:

1. A system for wireless transmission of electricity that utilizes Earth's magnetosphere, said system comprising:
    a plurality of generators each having a rod and being configured to generate electricity when energized;
    a cable electrically connected to said plurality of generators and positioned in a trench a predetermined distance below a ground surface proximate said plurality of generators, said cable being operative to transmit electricity to said plurality of plurality of generators;
    a tower electrically connected to said cable and having a transmitter, said tower having at least one leg that is movably positioned at predetermined intervals of time into a true North orientation such that said tower is operatively an electromagnet in electrical communication with the Earth's magnetosphere;
    an induction sphere that is positioned a predetermined distance below a top of said tower and that is in electrical communication with said cable, said induction sphere being configured to cause said tower to induce electrons from the magnetosphere to flow to said cable; and
    a plurality of transducers electrically associated with said plurality of generators and with said tower, respectively, at least one of said plurality of transducers being operative to convert electrons associated with said generated electrical power into a plurality of preparticles that include muons in electrical communication with said at least one leg of said tower;
    wherein said transmitter associated with said tower is in electrical communication with said at least one transducer and is operative to wirelessly transmit said plurality of preparticles into ambient air surrounding said tower.

2. The system as in claim 1, wherein said plurality of transducers includes five transducers electrically connected in series, said plurality of transducers being in electrical communication with said plurality of generators which are in electrical communication with said cable and operative to receive an electrical flux from said cable and to magnify said electrical flux for communication to said tower.

3. The system as in claim 1, wherein said plurality of preparticles are transmitted by said transmitter via a low frequency radio broadcast.

4. The system as in claim 2, wherein said induction sphere includes:
    a sphere casing having (1) a top portion having a copper plate ¼" inch thick that defines an interior layer that includes non-ferrous material and (2) a bottom portion coated with fluoropolymer material that is non-conductive and non-corrosive, wherein said sphere casing defines an interior area filled with a predetermined amount with steel turnings, filings, or shavings;
    wherein said sphere casing is coupled to and hangs from a top strut of said tower via a cable;
    wherein said sphere casing in in electrical communication with said cable.

5. The system as in claim 2, wherein:
    said five transducers include a first, second, and third transducer;
    said first and second transducers include magnets; and
    said third transducer does not include any magnets and is operative to convert electrons into said plurality of preparticles.

6. The system as in claim 1, further comprising a base member that is rotatably 2 mounted on a ground surface and electrically configured to rotate at predetermined intervals of 3 time, wherein said tower is mounted atop and extends upwardly from said base member.

7. The system as in claim 6, wherein:
    said at least one leg of said tower is a North tower leg mounted to said base member and extends upwardly, said rotation of said base member causing said North tower leg to face a true North magnetic pole, said North tower leg having a positive electrical charge;
    said tower includes a South tower leg mounted to said base member and extending upwardly and having a negative electrical charge, said South tower leg being positioned opposite to and spaced apart from said North tower leg;
    a West tower leg and an East tower leg opposite said West tower leg, said West and said East tower legs being dipoles having no electrical charge;
    wherein said induction sphere is positioned centrally between said North, South, West, East tower legs so as to magnetically induce electrons to move from the magnetosphere to said cable.

8. The system as in claim 6, wherein said cable is positioned in a trench defined in the ground surface proximate said plurality of generators, said trench being devoid of any metal material.

9. The system as in claim 8, wherein said trench includes an excavation that is 16 feet deep and less than 6 feet wide and defining a flat bottom, said trench including a first layer of crushed and cleaned bauxite ore upon which said cable is positioned, said trench including a second layer of crushed and cleaned bauxite ore positioned atop said cable.

10. A system for wireless transmission of electricity that utilizes Earth's magnetosphere, said system comprising:
    a plurality of generators each having a rod and being configured to generate electricity when energized;
    a cable electrically connected to said plurality of generators and positioned in a trench a predetermined distance below a ground surface proximate said plurality of generators, said cable being operative to transmit electricity to said plurality of plurality of generators;
    a base member that is rotatably mounted on a ground surface and electrically configured to rotate at predetermined intervals of time,
    a tower electrically connected to said cable and having a transmitter, said tower being mounted atop said base member so as to be movable at said predetermined intervals of time;
    wherein said tower includes at least one leg that is systematically positioned into a true North orientation such that said tower becomes an electromagnet in electrical communication with the Earth's magnetosphere;
    an induction sphere that is positioned a predetermined distance below a top of said tower and that is in electrical communication with said cable, said induction sphere being configured to cause said tower to induce electrons from the magnetosphere to flow to said cable; and
    a plurality of transducers electrically associated with said plurality of generators and with said tower, respectively, at least one of said plurality of transducers being operative to convert electrons associated with said generated electrical power into a plurality of preparticles that include muons in electrical communication with said at least one leg of said tower;

wherein said transmitter associated with said tower is in electrical communication with said at least one transducer and is operative to wirelessly transmit said plurality of preparticles into ambient air surrounding said tower.

11. The system as in claim 10, wherein:

said at least one leg of said tower is a North tower leg mounted to said base member and extends upwardly, said rotation of said base member causing said North tower leg to face a true North magnetic pole, said North tower leg having a positive electrical charge;

said tower includes a South tower leg mounted to said base member and extending upwardly and having a negative electrical charge, said South tower leg being positioned opposite to and spaced apart from said North tower leg;

said tower includes a West tower leg and an East tower leg opposite said West tower leg, said West and said East tower legs being dipoles having no electrical charge; and wherein said induction sphere is positioned centrally between said North, South, West, East tower legs so as to magnetically induce electrons to move from the magnetosphere to said cable.

12. The system as in claim 10, wherein said cable is positioned in a trench defined in the ground surface proximate said plurality of generators, said trench being devoid of any metal material.

13. The system as in claim 12, wherein said trench includes an excavation that is 16 feet deep and less than 6 feet wide and defining a flat bottom, said trench including a first layer of crushed and cleaned bauxite ore upon which said cable is positioned, said trench including a second layer of crushed and cleaned bauxite ore positioned atop said cable.

* * * * *